(12) United States Patent
Gorb et al.

(10) Patent No.: US 12,450,270 B2
(45) Date of Patent: Oct. 21, 2025

(54) METHOD AND SYSTEM FOR VALIDATING MEDIA CONTENT

(71) Applicant: YANDEX EUROPE AG, Luzem (CH)

(72) Inventors: Roman Gorb, Maykop (RU); Sergey Yudin, Saint Petersburg (RU); Alexey Zobnin, Moscow (RU); Pavel Oreshin, Saransk (RU)

(73) Assignee: Y.E. Hub Armenia LLC, Yerevan (AM)

( * ) Notice: Subject to any disclaimer, the term of this patent is extended or adjusted under 35 U.S.C. 154(b) by 267 days.

(21) Appl. No.: 18/218,184

(22) Filed: Jul. 5, 2023

(65) Prior Publication Data

US 2024/0012838 A1 Jan. 11, 2024

(30) Foreign Application Priority Data

Jul. 5, 2022 (RU) .................... 2022118276

(51) Int. Cl.
*G06F 16/3329* (2025.01)
*G06F 40/30* (2020.01)

(52) U.S. Cl.
CPC .......... *G06F 16/3329* (2019.01); *G06F 40/30* (2020.01)

(58) Field of Classification Search
CPC .............................. G06F 16/3329; G06F 40/30
See application file for complete search history.

(56) References Cited

U.S. PATENT DOCUMENTS

| | | | |
|---|---|---|---|
| 12,253,988 B1* | 3/2025 | Gillham | G06F 16/215 |
| 2013/0151641 A1 | 6/2013 | Myslinski | |
| 2016/0070742 A1 | 3/2016 | Myslinski | |
| 2016/0078149 A1 | 3/2016 | Gaucher et al. | |
| 2020/0202073 A1 | 6/2020 | Ghulati | |
| 2022/0319646 A1* | 10/2022 | Mukherjee | G16H 10/60 |

(Continued)

FOREIGN PATENT DOCUMENTS

RU  2632138 C2  10/2017

OTHER PUBLICATIONS

Rahimi et al.,"Explaining Documents' Relevance to Search Queries", published on Nov. 2, 2021, 24 pages, arXiv:2111.01314v1 [cs.IR].

(Continued)

*Primary Examiner* — Eric Yen
(74) *Attorney, Agent, or Firm* — BCF LLP

(57) ABSTRACT

A method and a server for factually validating a content of a given snippet of a plurality of snippets are provided. The method comprises: identifying, within the plurality of snippets, at least one other snippet for the given snippet, the at least one other snippet providing context to the given snippet; generating, for the given snippet, a respective target vector; generating, for the at least one other snippet, a respective context vector; feeding both the respective target vector and the respective context vector to a Natural Language Processing (NLP) model to determine a probability value indicative of whether a content of the at least one other snippet confirms factual accuracy of that of the given snippet, in response to the probability value being equal to or greater than a threshold probability value, determining that the content of the given snippet is factually accurate.

20 Claims, 7 Drawing Sheets

(56) References Cited

U.S. PATENT DOCUMENTS

2023/0144379 A1* 5/2023 Haikin .................. G06N 20/00
                                                              704/235
2023/0342551 A1* 10/2023 Eberle .................. G06F 40/232

OTHER PUBLICATIONS

Liu et al.,"GPT Understands, Too", published on Mar. 18, 2021, 10 pages, arXiv:2103.10385v1 [cs.CL].
U.S. Appl. No. 17/831,473, filed Jun. 3, 2022.
Russian Search Report dated Jan. 9, 2024 issued in respect of the counterpart Russian Patent Application No. RU 2022118276.

* cited by examiner

METHOD AND SYSTEM FOR VALIDATING MEDIA CONTENT

CROSS-REFERENCE

The present application claims priority to Russian Patent Application No. 2022118276, entitled "Method and System for Validating Media Content", filed Jul. 5, 2022, the entirety of which is incorporated herein by reference.

FIELD OF TECHNOLOGY

The present technology relates broadly to Natural Language Processing (NLP) methods and systems; and in particular, to the methods and system for validating factual accuracy of media content.

BACKGROUND

Various global or local communications networks (such as the Internet or local area networks and the like) offer a user a vast amount of information. The information includes a multitude of contextual topics, such as but not limited to celebrities, nature, science and technology, education, news and current affairs, maps, financial information and resources, traffic information, games and entertainment related information, and others. Users use a variety of client devices (desktop, laptop, notebook, smartphone, tablets and the like) to have access to rich content (like images, audio, video, animation, and other multimedia content from such networks).

Generally speaking, a given user can access a resource on the communications network by two principle means. The given user can access a particular resource directly, either by typing an address of the resource (typically a Universal Resource Locator, or URL, such as www.webpage.com) or by clicking a link in an e-mail or in another web resource. Alternatively, the given user may conduct a search using a search engine to locate a resource of interest. The latter is particularly suitable in those circumstances, where the given user knows a topic of interest, but does not know the exact address of the resource he or she is interested in.

To aid the user in searching for the resources, there are numerous search engines available to the user, such as a Yandex™ search engine, a Google™ search engine, a Yahoo™ search engine, and the like. Generally speaking, a given search engine can be configured to receive a search query from a user, perform a search, based on the received search query, and return a ranked search results page (SERP) to the user. The SERP can, for example, include general search results and vertical search results, from a specific segment of online content, such as pictures, videos, news, and the like.

Also, the search engine can be configured to generate and add, to the SERP, a short summary of the search results including certain portions thereof providing the user with an illustrative overview on a search object deduced from the search query.

For example, to execute a search for a favorite celebrity, the user can submit to the given search engine a respective query, such as "Keanu Reeves" or "Matrix lead actor", for example. Further, in response to the submitted query, the given search engine can be configured to determine that the search object of the user's search is Keanu Reeves, and return the SERP including, along with the ranked search results, an object card having, for example, a short summary on Keanu Reeves's biography. This object card can include, without limitation, a textual portion including key facts about the person in question, a picture thereof, and a trailer of a new movie for which they have worked.

The search engine can be configured to generate such an object card based on the provided search results. However, this approach to generating the summaries of the search objects can be flawed as certain sources from the search results can provide false or contradictory information about a given search object, which may result in providing to the user an untrustworthy object card on the given search object, which can further affect experience of the user from using the search engine.

Certain prior art approaches have been proposed to tackle the above-identified technical problem.

U.S. Pat. No. 9,454,562-B2, issued on Sep. 27, 2016, assigned to Lucas J. Myslinski, and entitled "OPTIMIZED NARRATIVE GENERATION AND FACT CHECKING METHOD AND SYSTEM BASED ON LANGUAGE USAGE" discloses a fact checking system analyzes and determines the factual accuracy of information and/or characterizes the information by comparing the information with source information. The fact checking system automatically monitors information, processes the information, fact checks the information in an optimized manner and/or provides a status of the information. In some embodiments, the fact checking system generates, aggregates, and/or summarizes content.

SUMMARY

It is an object of the present technology to ameliorate at least some inconveniences associated with the prior art.

Developers of the present technology have appreciated that the factual accuracy of a given portion (also referred to herein as "snippet") of the search object's pre-generated summary can be verified based on a context provided by other portions of the summary, such as those adjacent to the given one, for example. More specifically, the developers have devised methods and systems to train a machine-clearing algorithm (MLA) configured to determine a probability value indicative of whether a content of at least one other portion of the pre-generated summary confirms the given portion thereof, and in case of positive determination, in at least some non-limiting embodiments of the present technology, the content of the given portion can be determined as being factually accurate.

For example, the given portion can include a mentioning of a birth date of the search object, such as "Keanu Reeves, born Sep. 2, 1964". Another portion of the pre-generated summary can include a mentioning of an actual age of the search object, such as "By the age of 57, he has starred in more than 60 films and shows". Thus, having received both these portions, the MLA, trained in accordance with certain non-limiting embodiments of the present technology, can be configured to determine that the content of the other portion is likely to confirm the content of the given portion; and it can further be concluded that that the content of the given portion of the pre-generated summary is factually accurate.

By doing so, non-limiting embodiments of the present technology may allow providing more trustworthy object cards for the search objects, which can further translate in increasing user satisfaction from interacting with search engines.

More specifically, in accordance with a first broad aspect of the present technology, there is provided a computer-implemented method for factually validating a content of a given snippet of a plurality of snippets. The plurality of snippets have been generated for a search object by a generative machine-learning model. The search object has been identified based on a respective search query. The method is executable by a server. The method comprises: identifying, by the server, within the plurality of snippets, at least one other snippet for the given snippet, the at least one other snippet providing context to the given snippet; generating, by the server, for the given snippet, using a text embedding algorithm, a respective target vector representative of the given snippet; generating, by the server, for the at least one other snippet, using the text embedding algorithm, a respective context vector representative of the at least one context snippet; feeding, by the server, both the respective target vector and the respective context vector to a Natural Language Processing (NLP) model to determine a probability value indicative of whether a content of the at least one other snippet confirms factual accuracy of that of the given snippet, the NLP model having been trained to determine whether in-use snippets confirm factual accuracy of the given snippet; and in response to the probability value being equal to or greater than a threshold probability value, determining, by the server, that the content of the given snippet is factually accurate.

In some implementation of the method, the generative model is configured to generate the plurality of snippets based on reference digital documents of a plurality of digital documents responsive to the respective search query.

In some implementation of the method, a given digital document of the plurality of digital documents has been pre-assigned with a relevance parameter indicative of how relevant the given digital document to the respective search query is; and the reference digital documents have been determined as being associated with top N highest respective relevance parameters.

In some implementation of the method, the identifying the at least one other snippet for the given snippet comprises identifying at least one other snippet, content of which is semantically related to at least one fact of the search object in the given snippet.

In some implementation of the method, the generative machine-learning model is configured to generate the plurality of snippets being a cohesive text for the search object.

In some implementation of the method, the generative machine-learning model is a Transformer-based machine-learning model.

In some implementation of the method, the NLP model has been pre-trained to determine if two consecutive snippets of the plurality of snippets are semantically coherent therebetween.

In some implementation of the method, the NLP model has further been fine-tuned to determine the probability value of whether the content of the at least one other snippet confirms factual accuracy of that of the given snippet by applying to the NLP model an add-on machine learning model. The add-on machine-learning model having been trained to generate vector representations for the NLP model. Training the add-on machine-learning model comprises: obtaining, by the server, a plurality of training objects, a given training object of the plurality of training objects including (i) a respective first training snippet; (ii) at least one training prompt having been generated based on the respective first training snippet; (iii) a respective second snippet having been identified as being contextually related to the respective first snippet; and (iv) a respective label indicative of whether a content of the respective second training snippet factually confirms that of the respective first training snippet; and feeding, by the server, the plurality of training objects to the add-on machine-learning model to train the add-on machine-learning model to generate (i) the respective target vector for the given snippet; and (ii) the respective context vector for the at least one context snippet.

In some implementation of the method, the at least one prompt comprises a question which the respective first training snippet answers.

In some implementation of the method, the at least one training prompt comprises a rephrasing of the respective first training snippet.

In some implementation of the method, the respective label has been assigned by a human assessor.

In some implementation of the method, the NLP model has been fine-tuned, by the server, with weights thereof, determined after the NLP model was pre-trained, being frozen.

In some implementation of the method, the add-on machine-learning model comprises a Long Short-Term Memory (LSTM) neural network.

In some implementation of the method, fine-tuning of the NLP model comprises applying a P-tuning approach.

In some implementation of the method, the NLP model comprises a Transformer-based machine-learning model.

In accordance with a second broad aspect of the present technology, there is provided a server for factually validating a content of a given snippet of a plurality of snippets. The plurality of snippets have been generated for a search object by a generative machine-learning model. The search object has been identified based on a respective search query. The server comprises a processor and a non-transitory computer-readable memory storing instructions. The processor, upon executing the instructions, is configured to: identify within the plurality of snippets, at least one other snippet for the given snippet, the at least one other snippet providing context to the given snippet; generate, for the given snippet, using a text embedding algorithm, a respective target vector representative of the given snippet; generate, for the at least one other snippet, using the text embedding algorithm, a respective context vector representative of the at least one context snippet; feed both the respective target vector and the respective context vector to a Natural Language Processing (NLP) model to determine a probability value indicative of whether a content of the at least one other snippet confirms factual accuracy of that of the given snippet, the NLP model having been trained to determine whether in-use snippets confirm factual accuracy of the given snippet; and in response to the probability value being equal to or greater than a threshold probability value, determine that the content of the given snippet is factually accurate.

In some implementations of the server, to identify the at least one other snippet for the given snippet, the processor is configured to identify at least one other snippet, content of which is semantically related to at least one fact of the search object in the given snippet.

In some implementations of the server, the NLP model has been pre-trained to determine if two consecutive snippets of the plurality of snippets are semantically coherent therebetween.

In some implementations of the server, the NLP model has further been fine-tuned to determine the probability value of whether the content of the at least one other snippet confirms factual accuracy of that of the given snippet by applying to the NLP model an add-on machine learning model, and the processor is further configured to train the add-on machine-learning model to generate vector representations for the NLP model, by: obtaining a plurality of training objects, a given training object of the plurality of training objects including (i) a respective first training snippet; (ii) a at least one training prompt having been generated based on the respective first training snippet; (iii) a respective second snippet having been identified as being contextually related to the respective first snippet; and (iv) a respective label indicative of whether a content of the respective second training snippet factually confirms that of the respective first training snippet; and feeding the plurality of training objects to the add-on machine-learning model to train the add-on machine-learning model to generate (i) the respective target vector for the given snippet; and (ii) the respective context vector for the at least one context snippet.

In some implementations of the server, the at least one prompt comprises a question which the respective first training snippet answers.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus, information includes, but is not limited to audiovisual works (images, movies, sound records, presentations, etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
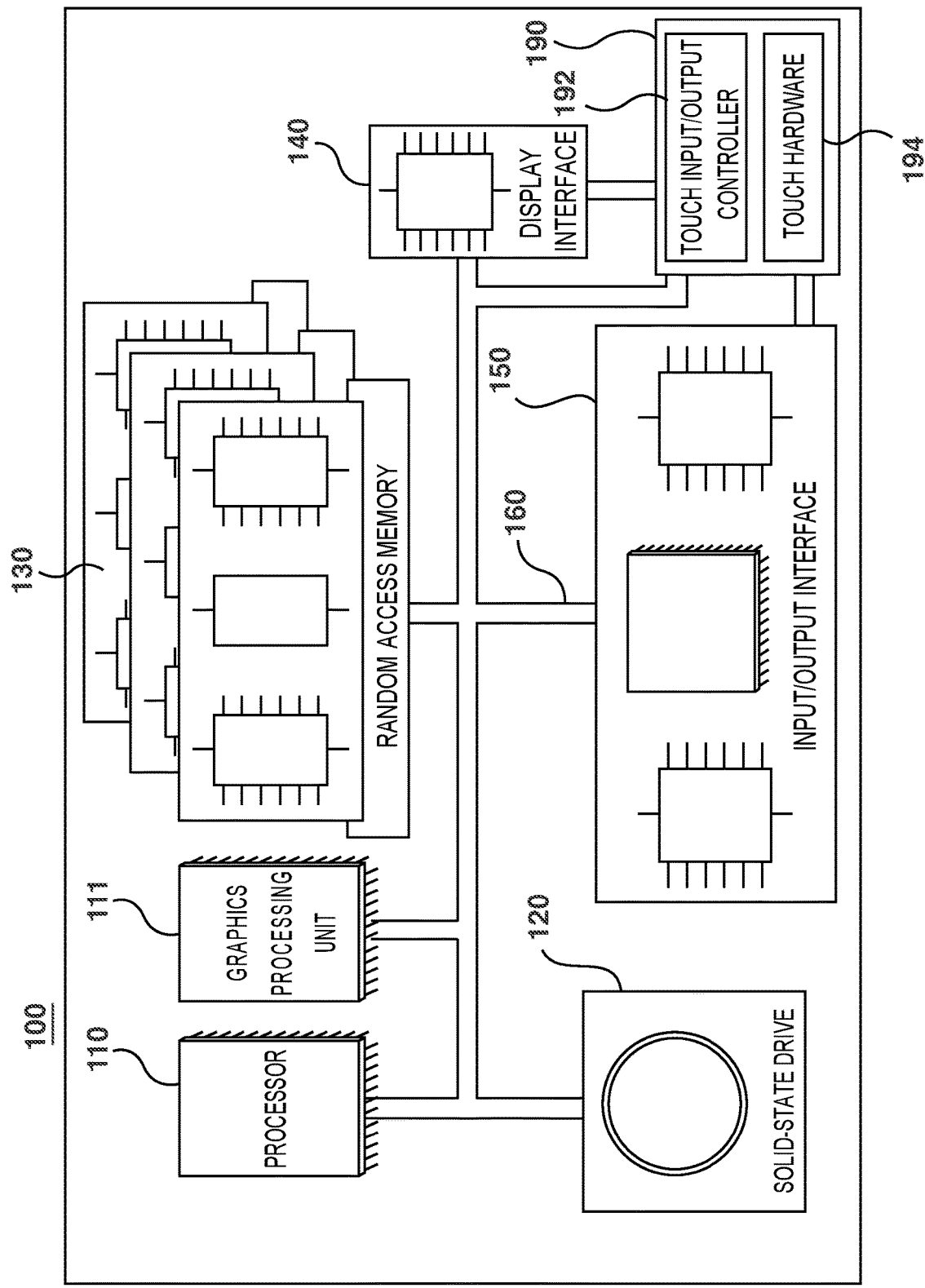
FIG. 1 depicts a schematic diagram of an example computer system for implementing certain non-limiting embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit," may be provided through the use of dedicated hardware as well as hardware capable of executing software in association with appropriate software. When provided by a processor, the functions may be provided by a single dedicated processor, by a single shared processor, and/or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random-access memory (RAM), and/or non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

With reference to FIG. 1, there is depicted a computer system 100 suitable for use with some implementations of the present technology. The computer system 100 comprises various hardware components including one or more single or multi-core processors collectively represented by a processor 110, a graphics processing unit (GPU) 111, a solid-state drive 120, a random-access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In some non-limiting embodiments of the present technology, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the computer system 100 in addition to or instead of the touchscreen 190.

It is noted that some components of the computer system 100 can be omitted in some non-limiting embodiments of the present technology. For example, the touchscreen 190 can be omitted, especially (but not limited to) where the computer system is implemented as a server.

According to implementations of the present technology, the solid-state drive 120 stores program instructions suitable for being loaded into the random-access memory 130 and executed by the processor 110 and/or the GPU 111. For example, the program instructions may be part of a library or an application.

Networked Computing Environment

Figure 2:
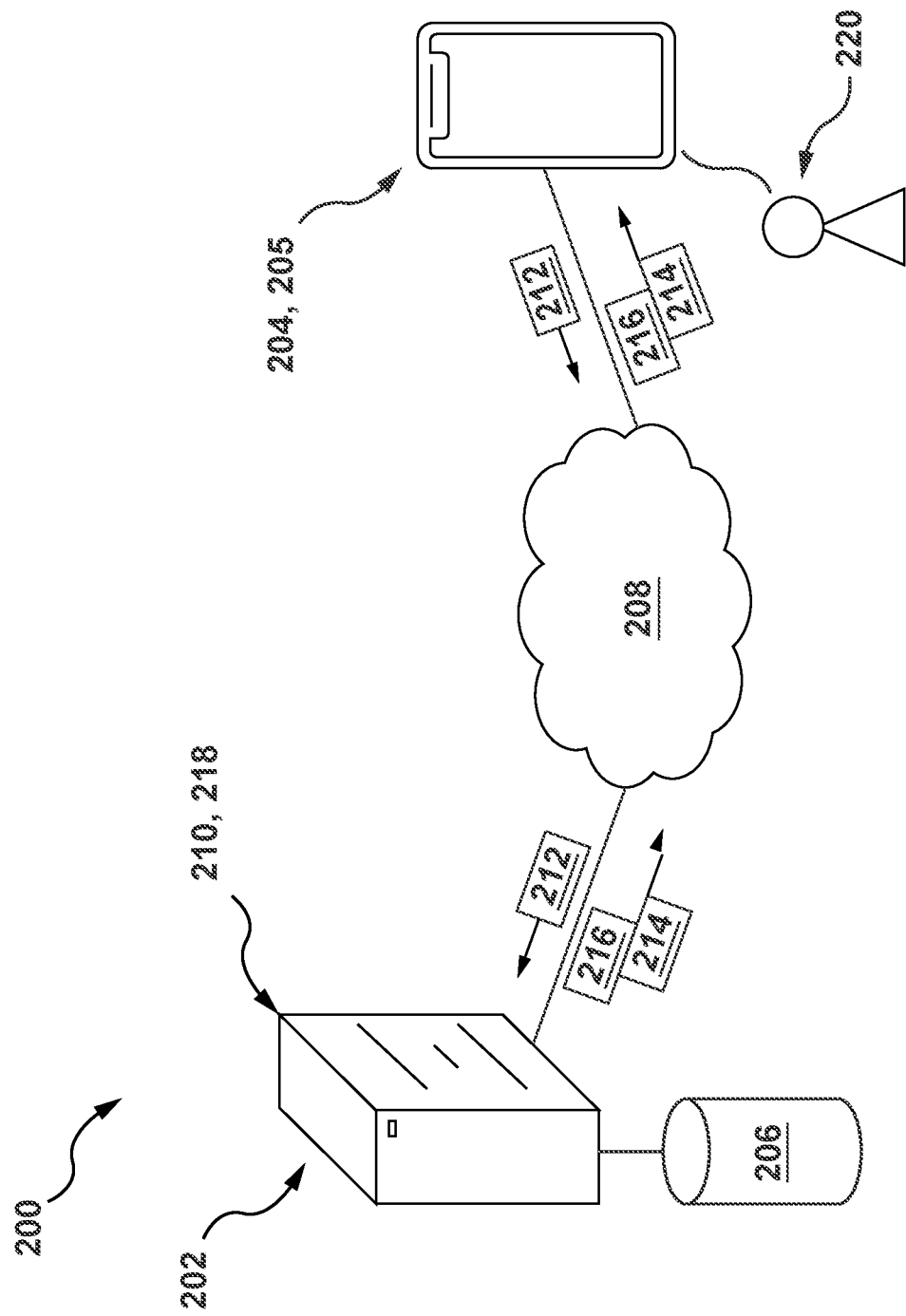
FIG. 2 depicts a networked computing environment suitable for training and using a machine-learning model to determine factual accuracy of a given snippet of a plurality of snippets, in accordance with certain non-limiting embodiments of the present technology.

With reference to FIG. 2, there is depicted a schematic diagram of a networked computing environment 200 suitable for use with some non-limiting embodiments of the systems and/or methods of the present technology. The networked computing environment 200 comprises a server 202 communicatively coupled, via a communication network 208, to an electronic device 204. In the non-limiting embodiments of the present technology, the electronic device 204 may be associated with a user 220.

In some non-limiting embodiments of the present technology, the electronic device 204 may be any computer hardware that is capable of running a software appropriate to the relevant task at hand. Thus, some non-limiting examples of the electronic device 204 may include personal computers (desktops, laptops, netbooks, etc.), smartphones, and tablets. It should be expressly understood that, in some non-limiting embodiments of the present technology, the electronic device 204 may not be the only electronic device associated with the user 220; and the user 220 may rather be associated with other electronic devices (not depicted in FIG. 2) that can be communicatively coupled, via the communication network 208, to the server 202 without departing from the scope of the present technology.

In some non-limiting embodiments of the present technology, the server 202 is implemented as a conventional computer server and may comprise some or all of the components of the computer system 100 of FIG. 1. In a specific non-limiting example, the server 202 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 202 is a single server. In alternative non-limiting embodiments of the present technology (not depicted), the functionality of the server 202 may be distributed and may be implemented via multiple servers.

In some non-limiting embodiments of the present technology, the server 202 can be configured to host an online search platform 210. Broadly speaking, the online search platform 210 denotes a web software system configured for conducting searches in response to submitting search queries thereto. Types of search results the online search platform 210 can be configured to provide in response to the search queries generally depend on a particular implementation of the online search platform 210. For example, in some non-limiting embodiments of the present technology, the online search platform 210 can be implemented as a search engine (such as a Google™ search engine, a Yandex™ search engine, and the like), and the search results may include digital documents of various types, such as, without limitation, audio digital documents (songs, voice recordings, podcasts, as an example), video digital documents (video clips, films, cartoons, as an example), text digital documents, and the like. Further, in some non-limiting embodiments of the present technology, the online search platform 210 may be implemented as an online listing platform (such as a Yandex™ Market™ online listing platform), and the search results may include digital documents including advertisements of various items, such as goods and services. Other implementations of the online search platform 210 are also envisioned.

Therefore, in some non-limiting embodiments of the present technology, the server 202 can be communicatively coupled to a search database 206 configured to store information of digital documents potentially accessible via the communication network 208, for example, by the electronic device 204. To that end, the search database 206 could be preliminarily populated with indications of the digital documents, for example, via the process known as "crawling", which, for example, can be implemented, in some non-limiting embodiments of the present technology, also by the server 202. In additional non-limiting embodiments of the present technology, the server 202 can be configured to store, in the search database 206, data indicative of every search conducted by the user 220 on the online search platform 210, and more specifically, search queries and respective sets of digital documents responsive thereto as well as their metadata, as an example.

Further, although in the embodiments depicted in FIG. 2, the search database 206 is depicted as a single entity, it should be expressly understood that in other non-limiting embodiments of the present technology, the functionality of the search database 206 could be distributed among several databases. Also, in some non-limiting embodiments of the present technology, the search database 206 could be accessed by the server 202 via the communication network 208, and not via a direct communication link (not separately labelled) as depicted in FIG. 2.

Thus, the user 220, using the electronic device 204, can access, for example, via a browser application 205, the online search platform 210, such by submitting a respective URL thereof to an address bar of the browser application 205. Further, the user 220 can submit a given search query 212 to the online search platform 210, and the online search platform 210 can be configured to identify, in the search database 206, a set of digital documents 214 responsive to the given search query 212. Further, to aid the user 220 in navigating through the set of digital documents 214, digital documents therein may need to be ranked, for example, according to their respective degrees of relevance to the given search query 212.

Figure 3:
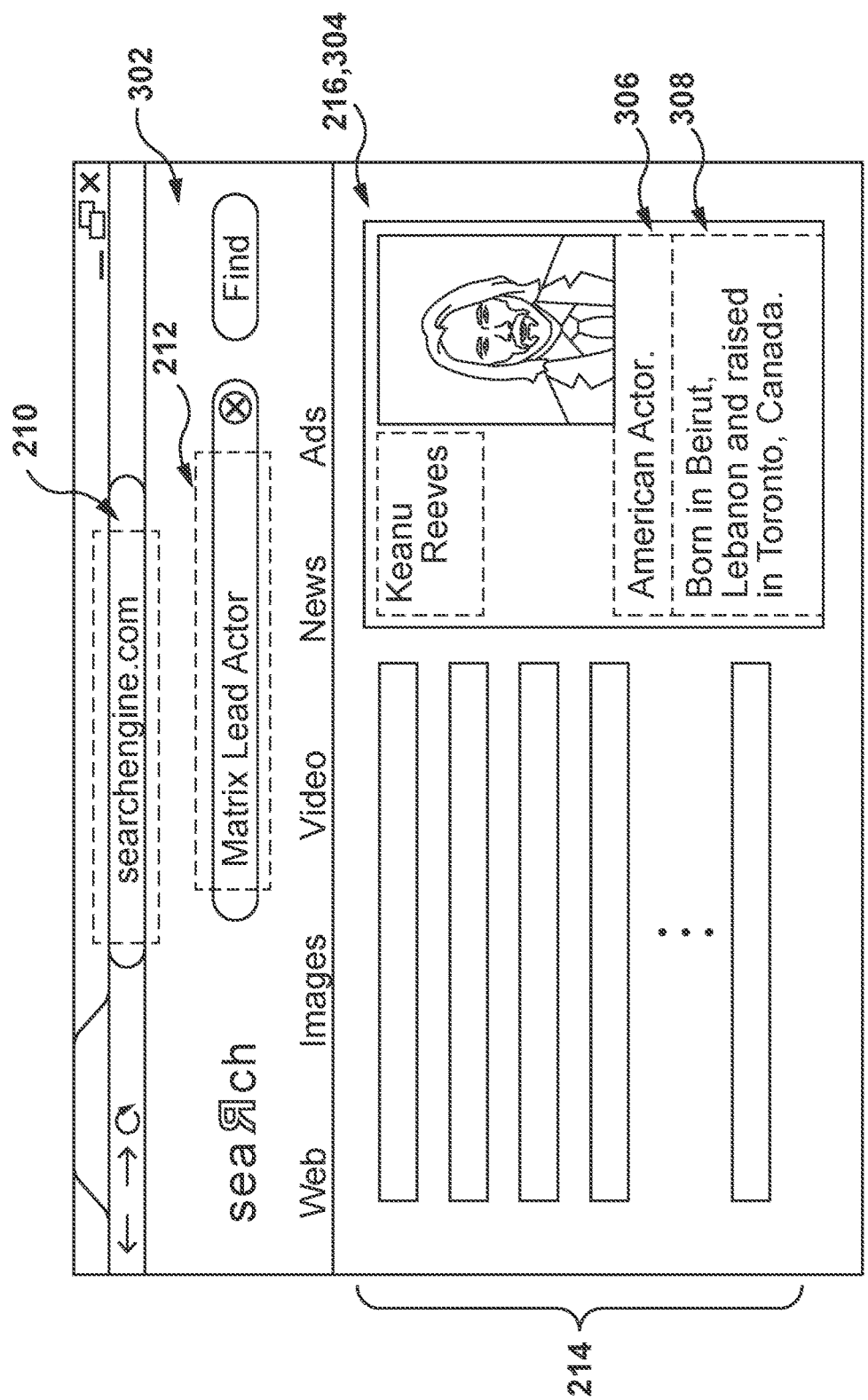
FIG. 3 depicts a schematic diagram of a graphical user interface (GUI) of a browser application rendering a visual representation of a search engine results page (SERP) provided by an online search platform hosted by a server present in the networked computing environment of FIG. 2, in accordance with certain non-limiting embodiments of the present technology.

With continued reference to FIG. 2 and with reference to FIG. 3, there is depicted a graphical user interface (GUI) of the browser application 215 providing a visual representation of a search engine results page (SERP) 302 of the online search platform 210 including the set of digital documents 214, in accordance with certain non-limiting embodiments of the present technology.

As it can be appreciated, in various non-limiting embodiments of the present technology, the online search platform 210 can be configured to provide the set of digital documents 214 including digital documents of various types, including, without limitation, textual digital documents, such as web digital documents including text content or digital documents of one of text formats, such as *.txt, *.docx, *.rtf; image digital documents, video digital documents, and the like.

Further, in some non-limiting embodiments of the present technology, along with the set of digital documents 214 responsive to the given search query 212, the online search platform 210 can be configured to generate a search summary 216 for a search object associated with the given search query 212, and add the search summary 216 in the SERP 302. More specifically, according to non-limiting embodiments of the present technology, the online search platform 210 can be configured to generate the search summary 216 in a form of an object card including certain digital documents that are most representative of a search object of the user 220.

For example, as illustrated in FIG. 3, the online search platform 210, based on the given search query 212 reading "Matrix Lead Actor" submitted thereto, can be configured to determine that the search object of the user 220 is Keanu Reeves, the actor, and further generate the search summary 216 for this search object. It is not limited how the online search platform 210 can be configured to identify the search object based on the given search query 212 and can include, in certain non-limiting embodiments of the present technology, identifying the search object based on digital documents identified as being relevant to previous search queries submitted by users of the communication network 208. In some non-limiting embodiments of the present technology, search objects can be pre-associated with respective search queries and respective digital documents responsive thereto in the search database 206.

Thus, the online search platform 210 can be configured to generate the search summary 216 including a plurality of snippets 304 forming a textual summary of the search object. In the context of the present specification, a "snippet" denotes a text portion, such as a sentence or a clause thereof, for example, including at least one fact about the search object. For example, as it can be further appreciated from FIG. 3, a first snippet 306 can include a fact about the nationality of Keanu Reeves identified as the search object of the given search query 212. However, it should be noted that, depending on a format of the search summary 216, the online search platform 210 can also be configured to include therein an image of the search object, as illustrated in FIG. 3, or digital documents of other types, such as video or audio, without departing from the scope of the present technology.

Further, according to certain non-limiting embodiments of the present technology, the online search platform 210 can be configured to generate the search summary 216 based on the digital documents of the set of digital documents 214 responsive to the given search query 212. For example, the online search platform 210 can be configured to determine, from the set of digital documents 214, reference digital documents for generating the search summary 216. It is not limited how the online search platform 210 can be configured to select the reference digital documents for generating the search summary 216. For example, in some non-limiting embodiments of the present technology, the online search platform 210 can be configured to (i) rank the set of digital documents 214; and (ii) select top N digital documents, such as 10, from the ranked set of digital documents as the reference digital documents. Further, it is not limited how the online search platform 210 can be configured to rank the set of digital documents 214, and in some non-limiting embodiments of the present technology, as mentioned above, can include ranking the set of digital documents 214 according to their respective degrees of relevance to the given search query 212. To that end, the online search platform 210 can apply one of the approaches described in a co-owned U.S. patent application Ser. No. 17/831,473 filed on Jun. 3, 2022, entitled "MULTI-PHASE TRAINING OF MACHINE LEARNING MODELS FOR SEARCH RESULTS RANKING", the content of which is incorporated herein by reference in its entirety.

As can be appreciated, depending on the format of the search summary 216, the online search platform 210 can be configured to determine a respective set of reference digital documents for each portion of the search summary 216. More specifically, for generating the plurality of snippets 304 forming the textual summary about the search object, the online search platform 210 can be configured to determine the respective set of reference digital documents within a portion of the set of digital documents 214 being general search results responsive to the given search query 212, for example. However, if the format of the search summary 216 includes the image of the search object, as illustrated in FIG. 3, for determining this image, the online search platform 210 can be configured to select the respective set of reference digital objects as a portion of the set of digital documents 214 as being vertical search results of image digital documents responsive to the given search query 212.

Further, according to certain non-limiting embodiments of the present technology, to generate, based on the respective set of reference digital documents, the plurality of snippets 304 for the search object, the online search platform 210 can be configured, by the server 202, to parse the respective set of reference digital documents, selected from the set of digital documents 214, as described above, to identify therein the plurality of snippets 304. To that end, as an example, in some non-limiting embodiments of the present technology, the server 202 can be configured to apply a generative machine-learning model (not depicted).

Broadly speaking, the generative machine-learning model is trained to identify, within the digital documents, snippets including factual information for respective search objects. Training of the generative machine-learning model can be executed, for example, by the server 202, based on a respective training set of data including a plurality of training digital objects, a given one of which comprises: (1) a given training portion of text identified within a training digital document; (2) an indication of factual information contained therein; and (3) a respective training search object to which/whom the factual information contained in the given training portion of text. In some non-limiting embodiments of the present technology, the indication of factual information can be provided by a human assessor. By doing so, the generative machine-learning model can be trained to extract snippets of factual information relating to the respective search objects filtering out those portions of the digital documents that do not include such information, such as portion including abstract descriptions, parenthetical constructions, facts about other objects, and the like.

In some non-limiting embodiment of the present technology, the generative machine-learning model can further be trained to generate the plurality of snippets 304 forming a cohesive text. More specifically, the generative machine-learning model can further be trained to re-write the snippets of the plurality of snippets 304 such that an entirety thereof forms a cohesive text. To that end, the generative machine-learning model can be fine-tuned based on an other training set of data comprising an other plurality of training objects, wherein a given one thereof includes: (1) a first training snippet; and (2) a second training snippet following immediately after the first training snippet; and (3) a rephrasing of the second training snippet forming a cohesive textual unit with the first snippet. In some non-limiting embodiments of the present technology, the re-phrasing of the second training snippet can be provided by a human assessor.

It is not limited how the generative machine-learning model can be implemented; and in some non-limiting embodiments of the present technology, it may be implemented as a Transformer-based machine-learning model, an architecture of which will be described below with reference to FIG. 4. However, in other non-limiting embodiments of the present technology, the generative machine-learning model can be implemented based on any other neural network architecture, such as a Long Short-Term Memory (LSTM) neural network (NN), a Variational Autoencoder NN, and others.

Thus, once the server 202 has generated the plurality of snippets 304, the online search platform 210 can be configured to include it in the search summary 216 for the search object identified based on the given search query 212. However, although each one of the plurality of snippets 304, such as the first snippet 306, can include a grammatically correct text portion, they may be factually inaccurate. For example, one of the respective set of reference digital documents identified in the set of digital documents 214, used for generating the first snippet 306, contained a false fact about Keanu Reeves—namely, that he is an "American actor" (as opposed to factually correct statement of Keanu Reeves being a "Canadian actor"). Such flawed summaries provided to the user 220 may affect their user satisfaction from interacting with the online search platform 210.

Therefore, the methods and systems described herein are directed to factually validating content of each one of the plurality of snippets 304, such as that of the first snippet 306. More specifically, the developers of the present technology have devised methods including determining if the content of the first snippet 306 is factually accurate based on a content of at least one other snippet of the plurality of snippets 304, such as a second snippet 308 providing context to the first snippet 306. For example, in some non-limiting embodiments of the present technology, the server 202 can be configured to identify the second snippet as being at least one of neighboring snippets, such as a second snippet 308.

However, in other non-limiting embodiments of the present technology, the server 202 can be configured to identify the second snippet 308 based, for example, on a linguistic analysis of content thereof. More specifically, the server 202 can be configured to identify the second snippet 308 as a snippet including words semantically similar to those of the first snippet 306, as an example.

To that end, according to at least some non-limiting embodiments of the present technology, the server 202 can be configured to train and further apply a Natural Language Processing (NLP) model 218 to determine a probability value indicative of whether the content of the second snippet 308 confirms factual accuracy of the content of the first snippet 306. Further, based on the so determined probability value, the present methods can include determining, whether the content of the first snippet 306 is factually correct.

For example, using the NLP model 218, trained according to certain non-limiting embodiments of the present technology, the present methods may allow determining that the content of the second snippet 308 does not confirm the factual accuracy of that of the first snippet 306. More specifically, the present methods may allow determining that there is discrepancy between the content of the second snippet 308 and that of the first snippet 306, namely, that a person born in Lebanon and raised in Canada is very unlikely to be referred to as "American". Thus, the content of the first snippet 306 can be determined as being factually incorrect.

Generally speaking, the server 202 can be said to be executing two respective processes in respect of the NLP model 218. A first process of the two processes is a training process, where the server 202 is configured to train the NLP model 218, based on a respective training set of data, to determine whether in-use snippets confirm the factual accuracy of the first snippet 306, which will be discussed below with reference to FIGS. 4 to 6. A second process is an in-use process, where the server 202 executes the so-trained NLP model 218 which will be described further below.

It is not limited how the NLP model 218 is implemented, and in certain non-limiting embodiments of the present technology, the NLP model 218 can be implemented based on one of a Recurrent NN (RNN), Convolutional NN (CNN), or LSTM NN, as an example. In specific non-limiting embodiments of the present technology, the NLP model 218 can be implemented based on a Transformer-based machine-learning model, architecture of which will now be described with reference to FIG. 4.

Communication Network

In some non-limiting embodiments of the present technology, the communication network 208 can be the Internet. In alternative non-limiting embodiments of the present technology, the communication network 208 can be implemented as any suitable local area network (LAN), wide area network (WAN), a private communication network or the like. It should be expressly understood that implementations for the communication network are for illustration purposes only. How a respective communication link (not separately numbered) between each one of the server 202 and the electronic device 204 and the communication network 208 is implemented will depend, inter alia, on how each one of the server 202 and the electronic device 204 is implemented. Merely as an example and not as a limitation, in those embodiments of the present technology where the electronic device 204 is implemented as a wireless communication device such as a smartphone, the communication link can be implemented as a wireless communication link. Examples of wireless communication links include, but are not limited to, a 3G communication network link, a 4G communication network link, and the like. The communication network 208 may also use a wireless connection with the server 202.

Machine-Learning Model Architecture

Figure 4:
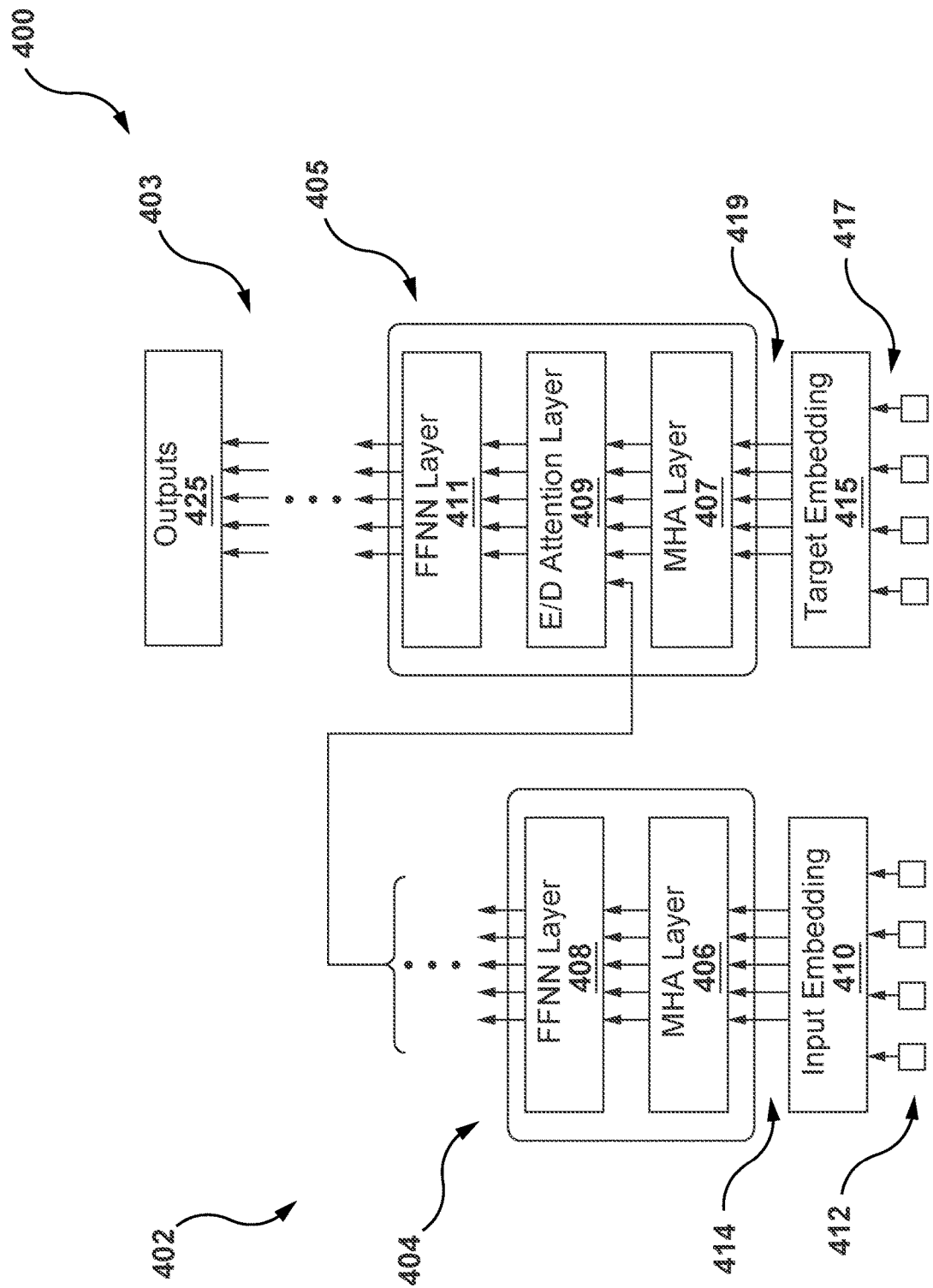
FIG. 4 depicts a block diagram of a machine-learning model architecture of the machine-learning model run by the server present in the networked computing environment of FIG. 2, in accordance with certain non-limiting embodiments of the present technology.

With reference to FIG. 4, there is depicted a machine-learning model architecture 400 suitable for use with at least some non-limiting embodiments of the present technology. The machine-learning model architecture 400 is based on a Transformer neural network model architecture as described, for example, in an article by Vaswani et al. "Attention Is All You Need," and published in the Proceedings of 31*s* t Conference on Neural Information Processing Systems (NIPS 2017), the content of which is incorporated herein by reference in its entirety.

Thus, the machine-learning model architecture 400 can comprise an encoder stack of layers 402 and a decoder stack of layers 403, which can be configured to process input data 412 and target data 417 of the machine-learning model architecture 400, respectively.

Further, a given encoder block 404 of the encoder stack of layers 402 includes an encoder multi-head attention (MHA) layer 406 and an encoder feed-forward NN layer 408. The encoder MHA layer 406 includes dependencies between portions of the input data 412 provided thereto. For example, if the input data 412 includes text data, such as a text sentence, the encoder MHA layer 406 may include dependencies between words of the sentence. In another example, where the input data 412 to the encoder stack of layer 402 includes an audio signal, such as that representing a human utterance, the encoder MHA layer 406 may include dependencies between certain sounds and/or acoustic features of the human utterance. Such dependencies can be used by the encoder MHA layer 406 for determining contextual information of a given portion of the input data 412 to the encoder stack of layers 402 (such as that representative of a given word of the first snippet 306) relative to another portion of the input data 412.

Further, the encoder feed-forward NN layer 408 is configured to transform data input thereto from the encoder MHA layer 406 into a format receivable by one or more following layers of the machine-learning model architecture 400, such as an encoder-decoder MHA layer 409, as will be described below. The encoder feed-forward NN layer 408 generally lacks dependencies of the encoder MHA layer 406, and thus the inputs to the encoder feed-forward NN layer 408 may be processed in parallel.

Further, the input data 412 to the encoder stack of layers 402 can be represented by a plurality of input vectors 414 generated by an input embedding algorithm 410. Generally speaking, the input embedding algorithm 410 is configured to generate fixed-dimensional vector representations of the input data 412 in a respective embedding space. In other words, if the input data 412 comprise text data, such as the content of one of the first snippet 306 and the second snippet 308, for example, the input embedding algorithm 410 can be configured to generate the plurality of target vectors 419, where coordinates of vectors representative of words of the first snippet 306 similar in meaning are positioned closer to each other in the respective embedding space. Thus, the input embedding algorithm 410 can be implemented as a text embedding algorithm including, without limitation, one of a Word2Vec text embedding algorithm, a GloVe text embedding algorithm, and the like.

It should be noted that the encoder stack of layers 402 can include multiple encoder blocks, such as 6 or 12, for example, implemented similarly to the given encoder block 404.

Further, a given decoder block 405 of the decoder stack of layers 403 of the machine-learning model architecture 400 also includes (i) a decoder MHA layer 407; and (ii) a decoder feed-forward NN layer 411, which can generally be implemented in a similar fashion to the encoder MHA layer 406 and the encoder feed-forward NN layer 408, respectively. However, the architecture of the given decoder block 405 differs from that of the given encoder block 404 in that that the given decoder block 405 additionally includes the encoder-decoder MHA layer 409. The encoder-decoder MHA layer 409 is configured to (i) receive input vectors from the encoder stack of layers 402 and from the decoder MHA layer 407; and thus (ii) determine, during a training process, as will become apparent from the description provided below, dependencies between the input data 412 and the target data 417 (such as text data, for example) of the machine-learning model architecture 400 input to the decoder stack of layers 403. In other words, outputs of the encoder-decoder MHA layer 409 are attention vectors including data indicative of relationships between respective portions of the input data 412 and the target data 417.

Similar to the input data 412, for feeding the target data 417 to the given decoder block 405, a target embedding algorithm 415 can be applied to the target data 417 for generating a plurality of target vectors 419 comprising numerical representations of respective portions of the target data 417. As it can be appreciated, in those embodiments where the target data 417 comprises text data, the target embedding algorithm 415 can be implemented similarly to the input embedding algorithm 410.

Similarly, it should be noted that the decoder stack of layers 403 can include multiple decoder blocks, such as 6 or 12, for example, implemented similarly to the given decoder block 405. Also, as it can be appreciated, after the training the machine-learning model architecture 400, each block of the encoder stack of layers 402 and the decoder stack of layers 403 will have different weights contributing to the generation of the output data 425. For adjusting the weights during the training process, a backpropagation algorithm can be applied to the machine-learning model architecture 400, and a difference between the input data 412 and the output data 425 can be determined and further minimized. Such difference can be expressed by a loss function, such as a Cross-Entropy Loss Function.

It should be expressly understood that other implementations of the loss function are also envisioned by the non-limiting embodiments of the present technology and may include, by way of example, and not as a limitation, a Mean Squared Error Loss function, a Huber Loss function, a Hinge Loss function, and others.

The output data 425 of the machine-learning model architecture 400 can include an output vector corresponding to a given one of the plurality of input vectors 414. For example, as will become apparent from the description below, in those embodiments, where the input data 412 to the machine-learning model architecture 400 includes the first snippet 306 and the second snippet 308, the output data 425 can include a probability value indicative of whether the content of the second snippet 308 is semantically coherent with that of the first snippet 306.

It will be understood that the architecture of the machine-learning model architecture 400 described with reference to FIG. 4 has been simplified for ease of understanding; and an actual implementation of the machine-learning model architecture 400 may include additional layers and/or blocks, as described, for example, in the Vaswani et al. article referenced above. For example, in some implementations of the machine-learning model architecture 400, each of the given encoder block 404 and the given decoder bock 405 may also include layer normalization operations. Additionally, generating the output data 425 may include applying a softmax normalization function at an output of the decoder stack of layers 403, and so on. One of ordinary skill in the art would understand that these operations are commonly used in neural networks and deep learning models such the machine-learning model architecture 400.

NLP Model

According to certain non-limiting embodiments of the present technology, the NLP model 218 can be implemented based on the machine-learning model architecture 400 described above. More specifically, in some non-limiting embodiments of the present technology, the NLP model 218 can also include the encoder stack of layers 402 and the decoder stack of layers 403 including multiple encoder and decoder blocks; however, respective numbers of such blocks in each of the encoder stack of layers 402 and the decoder stack of layers 403 can be different from those in the machine-learning model architecture 400.

For example, in some non-limiting embodiments of the present technology, the NLP model 218 can include one encoder block and thirteen decoder blocks implemented similarly to the given encoder block 404 and the given decoder block 405, respectively, as described above. In other non-limiting embodiments of the present technology, the NLP model 218 can include no encoder blocks and multiple decoder blocks, such as 6, 12, or 96, as an example, in which case the NLP model 218 can be referred to as a Generative Pre-trained Transformer (GPT) model. By contrast, in yet other non-limiting embodiments of the present technology, the NLP model 218 can include only encoder blocks, such as 12, 24, or 36, as an example, and no decoder blocks, in which case the NLP model 218 can be referred to as a Bidirectional Encoder Representations from Transformers (BERT) model. Accordingly, in these embodiments, where only encoder or decoder blocks form the NLP model 218, the input data 412 and the target data 417 thereof are input as a single vector.

Other configurations of the encoder stack of layers 402 and the decoder stack of layers 403 for implementing the NLP model 218 are also envisioned without departing from the scope of the present technology.

As mentioned herein above, according to non-limiting embodiments of the present technology, the server 202 can be configured to train the NLP model 218 to determine the probability value of whether the content of the at least one other snippet of the plurality of snippets 304 confirms the factual accuracy of the first snippet 306. To that end, according to certain non-limiting embodiments of the present technology, the server 202 can be configured to train the NLP model in two stages: at a first training stage, or a pre-training stage, the server 202 can be configured to train, based on a first training set of data, the NLP model 218 to determine a first probability value of whether the contents of two in-use snippets, such as those of the first snippet 306 and the second snippet 308 of the plurality of snippets 304 are semantically coherent. In other words, at the first training stage, the server 202 is configured to train the NLP model 218 to determine whether the contents of each one of the first snippet 306 and the second snippet 308 relate to a same subject, such as to a nationality of the search object, as described above with reference to FIG. 3.

Further, following the first training stage, at a second training stage, which is also referred to herein as a fine-tuning stage, the server 202 can be configured to train, based on a second training set of data, the NLP model 218 to determine a second probability value indicative of whether the second snippet 308 confirms factual accuracy of the first snippet 306. Both the first training stage and the second training stage will now be described with reference to FIGS. 5 and 6.

Training Process

Referring back to FIG. 4, at the first training stage, the server 202 can be configured to feed the first training set of data to the NLP model 218, thereby training the NLP model 218 to determine whether the contents of the two in-use snippets are semantically coherent. In some non-limiting embodiments of the present technology, the first training set of data comprises a first plurality of training digital objects, a given one of which comprises: (i) a first training snippet; (ii) a second training snippet; and (iii) a respective label indicative of whether the second training snippet is semantically coherent with the first training snippet. As it can be appreciated, the server 202 can be configured to generate the first plurality of training digital objects based on a plurality of training digital documents where training snippets have been preliminarily identified, such as by the generative machine-learning model described above.

In some non-limiting embodiments of the present technology, the second training snippet can be determined as being a neighboring snippet to the first training snippet. In other non-limiting embodiments of the present technology, the second training snippet can be determined as being a snippet including semantically similar words to those of the given training snippet. In yet other non-limiting embodiments of the present technology, the second training snippet can be a rephrasing of the first training snippet provided by a human assessor. For example, if the first training snippet of the given training digital object reads "Rachel McAdams is a Canadian actress", the second training snippet can be determined as one reading "She was born in London, Ontario, Canada".

In some non-limiting embodiments of the present technology, the respective label indicative of whether the first and second snippets are semantically coherent can be assigned by the human assessor instructed to determine semantic coherence between the training snippets. For example, the respective label can take binary values, such as "0" and "1"; "YES" and "NO"; and the like. However, in other non-limiting embodiments of the present technology, the respective label can be non-binary taking values indicative of an extent of semantic coherence between the first training snippet and the second training snippet, such as 0.3, 0.7, 0.8; or "LOW", "MODERATE", "HIGH"; and the like.

Further, the server 202 can be configured to feed the given training digital object to the NLP model 218 by feeding the first and second training snippets as part of the input data 412, and the respective label as the target data 417. Similarly, the server 202 can be configured to generate and feed to the NLP model 218 the first plurality of training digital objects including thousands, hundreds of thousands, or even millions of similar training digital objects. By doing so, the server 202 can be configured to train the NLP model 218 to generate the output data 425 including the first probability value of whether the contents of two in-use snippets, such as the first snippet 306 and the second snippet 308, are semantically coherent. Further, using the back-propagation algorithm, the server 202 can be configured to determine the loss function representative of a difference between the first probability value of the output data 425 and the ground truth, indicated by the respective label. Further, by minimizing the loss function, the server 202 can be configured to determine weights for nodes of the NLP model 218. This concludes the first training stage of the NLP model 218.

Following the first training stage, the server 202 can be configured to proceed to the second training stage where the server 202 is configured to train the NLP mode 218 to determine the second probability values indicative of whether the content of the second snippet 308 confirms the factual accuracy of the content the first snippet 306. To that end, the server 202 can be configured to feed, to the NLP model 218, pre-trained at the first training sage, the second training set of data. According to certain non-limiting embodiments of the present technology, the second training set of data comprises a second plurality of training digital objects, a given one of which comprises: (i) a first training snippet; (ii) a second training snippet; (iii) at least one training prompt generated based on the first training snippet; and (iv) a respective label indicative of whether a content of the second training snippet confirms factual accuracy of the first training snippet.

According to some non-limiting embodiments of the present technology, the first and second training snippets of the given one of the second plurality of training digital objects can be determined similarly to those of the given one of the first plurality of training digital objects. Thus, in some non-limiting embodiments of the present technology, the server 202 can be configured to generate the given one of the second plurality of training digital objects based on the given one of the first plurality of training digital objects.

Further, broadly speaking, the at least one prompt generated, such as by the human assessor, based on the first training snippet can be for providing a more specific context to the first training snippet. In some non-limiting embodiments of the present technology, the at least one prompt can comprise a rephrasing of the first training snippet. Referring back to the above example, where the first training snippet reads "Rachel McAdams is a Canadian actress", the at least one prompt can comprise a rephrasing reading, for example, "Rachel McAdams is an actress from Canada" or "Rachel McAdams is an actress living and working in Canada", and the like. However, in other non-limiting embodiments of the present technology, the at least one prompt can comprise a question which the first training snippet answers. Continuing with the above example, the at least one prompt can read "What is the origin of Rachel McAdams? Canadian." or "What country does Rachel McAdams come from? Canada.", and the like. It should be noted that generating the at least one training prompt can also be executed automatically, for example, by the server 202, using a dedicated language model pre-configured to generate respective prompts based on snippets input thereto.

Further, the respective label of the given one of the second plurality of training digital objects, akin to that of the given one of the first plurality of training digital objects, can be assigned by the human assessor instructed to determine factual correspondence between the first training snippet and the second training snippet. Similar to the case of the first plurality of training digital objects, the respective label of the given one of the second plurality of training digital objects can take either binary or non-binary values.

Further, in some non-limiting embodiments of the present technology, the server 202 can be configured to feed the given one of the second plurality of training digital objects to the NLP model 218 by feeding the first and second training snippets and the at least one prompt as the input data 412, and the respective label as the target data 417. Similarly, the server 202 can be configured to generate and feed, to the NLP model 218, each other one of the second plurality of training digital objects including thousands, hundreds of thousands, or even millions of similar training digital objects. By doing so, the server 202 is configured to train the NLP model 218 to determine the second probability value indicative of whether the content of the second snippet 308 confirms the factual accuracy of the content of the first snippet 306 of the plurality of snippets 304 output in the search summary 216. Further, akin to the first training stage, using the back-propagation algorithm, and by minimizing the loss function, the server 202 can be configured to re-determine the weights for the nodes of the NLP model 218.

However, in other non-limiting embodiments of the present technology, the server 202 can be configured to execute the second training stage without re-determining the weights of the nodes of the NLP model 218. By contrast, in these embodiments, following the first training stage, the server 202 can be configured to apply a P-tuning approach to the fine-tuning the NLP model 218. More specifically, in these embodiments, the server 202 can be configured to train another machine-learning model to generate vectors to be input to the NLP model 218, based on which, the NLP model 218 can further be configured to determine the second probability value.

Figure 5:
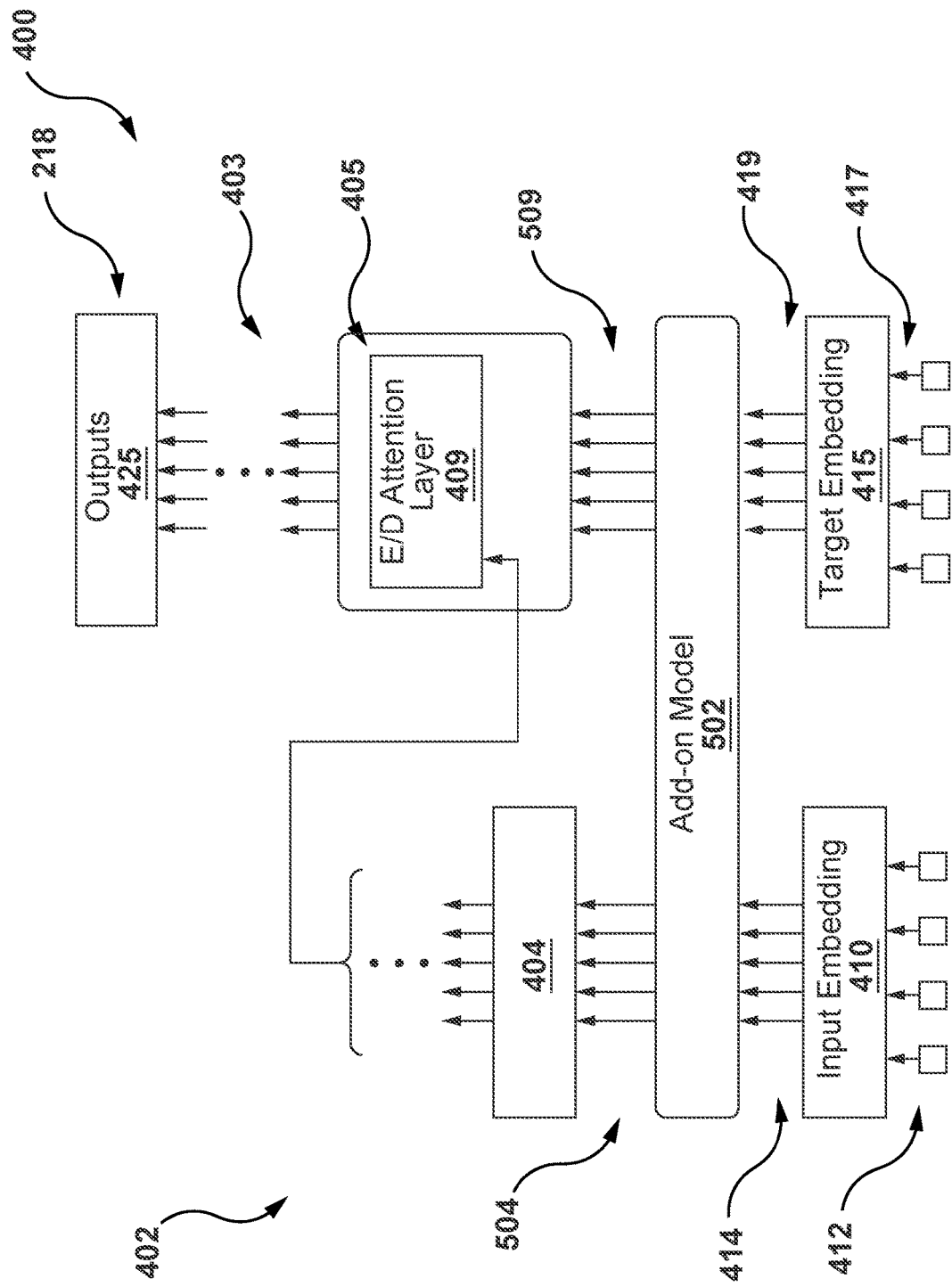
FIG. 5 depicts a block diagram of another configuration of the machine-learning model architecture of the machine-learning model run by the server present in the networked computing environment of FIG. 2, in accordance with certain non-limiting embodiments of the present technology.

With reference to FIG. 5, there is depicted a schematic diagram of the NLP model 218 with an add-on model 502 applied thereto, in accordance with certain non-limiting embodiments of the present technology.

As it can be appreciated from FIG. 5, in lieu of directly using the plurality of input vectors 414 and the plurality of target vectors 419 as inputs to the encoder stack of layers 402 and the decoder stack of layers 403, respectively, the NLP model 218 can be configured to input these vectors to the add-on model 502. Further, the server 202 can be configured to train the add-on model 502 to generate, based on the input vectors 414 and the target vectors 419, add-on input vectors 504 and add-on target vectors 509, respectively, that are further used for generating the output data 425 of the NLP model 218.

It is not limited how the add-on model 502 can be implemented. In one example, according to certain non-limiting embodiments of the present technology, the add-on model 502 can be implemented based on a NN, such as a multilayer feed-forward NN having, for example, 6 or 12 layers. However, in other non-limiting embodiments of the present technology, the add-on model 502 can be implemented based on a LSTM NN.

Figure 6:
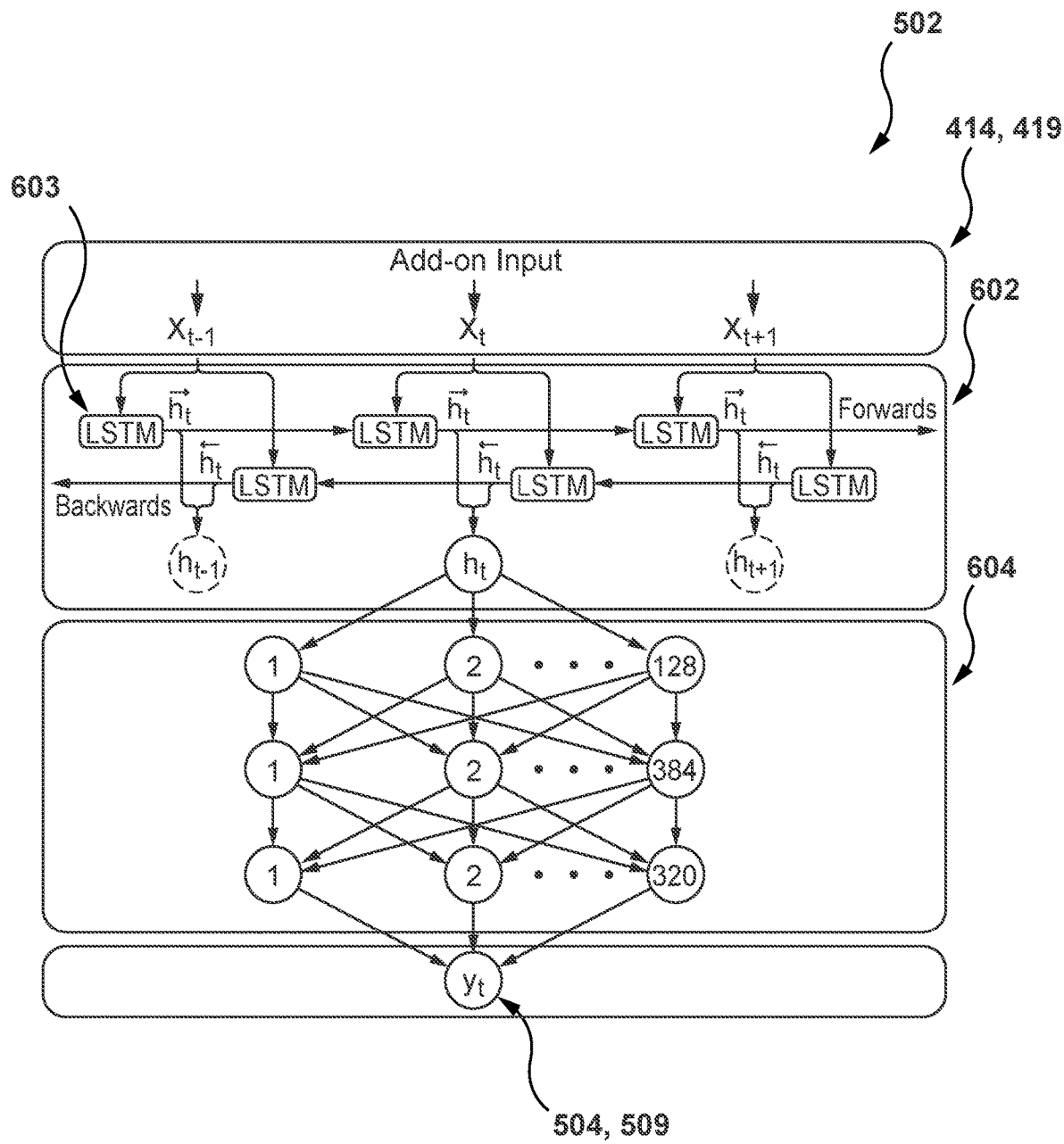
FIG. 6 depicts a block diagram of an add-on machine-learning model used as part of the configuration of the machine-learning model of FIG. 5, in accordance with certain non-limiting embodiments of the present technology.

With reference to FIG. 6, there is depicted a schematic diagram of an architecture of the add-on model 502 implemented based on a bidirectional LSTM NN 602, in accordance with certain non-limiting embodiments of the present technology.

Broadly speaking, the bidirectional LSTM NN 602 is a NN including so-called memory nodes, such as a memory node 603, configured for learning long-term dependencies between weights thereof over multiple training iterations. In other words, at a given iteration of training, the memory node 603 generates a respective current weight thereof based not only on a current weight of a node from a previous layer but also based on its previous respective weight from a previous iteration of training.

Also, in some non-limiting embodiments of the present technology, the add-on model 502 can further include a multilayer perceptron 604, which may include, for example, two or three perceptron layers (not separately numbered). Further, although in the embodiments of FIG. 6, each of the layers of the multilayer perceptron 604 has 128, 384, and 320 nodes, respectively, it should be expressly understood that other respective numbers of nodes are also envisioned without departing from the scope of the present technology.

Further, in some non-limiting embodiments of the present technology, the server 202 can be configured to train the add-on model 502 based on the second training set of data mentioned above. More specifically, for the given one of the second plurality of training digital objects, by applying the input embedding algorithm 410 and the target embedding algorithm 415, the server 202 can be configured to generate respective configurations of the plurality of input vectors 414 and the plurality of target vectors 419, which are further input to train the add-on model 502 to generate the add-on input vectors 504 and the add-on target vectors 509.

However, in other non-limiting embodiments of the present technology, the server 202 can be configured to train the add-on model 502 based on a third training set of data. The third training set of data can be generated in a similar fashion as the second training set of data; however, the third training set of data can include fewer training digital objects than the second training set of data. In other words, the third set of data can be smaller in size than the second training set of data.

Further, similar to the training of the NLP model 218, using the back-propagation algorithm and minimizing the loss function, the server 202 can be configured to determine weights of the nodes of the add-on model 502. Further details on training the add-on model 502 can be found, for example, in an article "GPT Understands, too" authored by Liu et al., the content of which is incorporated herein by reference in its entirety.

By doing so, the server 202 can be configured to train the add-on model 502 to generate vector embeddings for the NLP model 218, pre-trained during the first training stage as described above. Based on these vector embeddings, the NLP model 218 can further be configured to determine the second probability value of whether the content of the second snippet 308 confirms factual accuracy of that of the first snippet 306.

Thus, such an approach to fine-tuning the NLP model 218 to determine the second probability value allows avoiding re-adjusting, after the first training stage, the weights of the entirety of nodes of the NLP model 218, including, in some implementations, over a hundred billion nodes. Instead, this approach is directed to only training the add-on model 502, generally including substantially fewer nodes. In other words, in these embodiments, the fine-tuning stage is executed with the weights of the nodes of the NLP model 218, determined at the first training stage, being frozen. By doing so, the present methods and systems allow saving computational resources of the server 202 on the training of the NLP model 218. Also, this approach to the fine-tuning of the NLP model 218 can be especially appreciated in unavailability of high-quality data for executing the second training stage.

In-Use Process

During the in-use process, as mentioned hereinabove with reference to FIG. 3, having generated the search summary 216 including the plurality of snippets 304, in response to receiving the given search query 212, the server 202 can further be configured to select, from the plurality of snippets 304, the first snippet 306 for factual validation thereof. Further, the server 202 can be configured to identify the second snippet 308 in the plurality of snippets 304 that is contextually related to the first snippet 306. For example, the server 202 can be configured to identify the second snippet 308 as one of neighboring snippets to the first snippet 306.

Further, the server 202 can be configured to feed both the first snippet 306 and the second snippet 308 as the input data 412 to the NLP model 218 trained according to one of the approaches described above. In response, the NLP model 218 can be configured to generate the output data 425 including the second probability value indicative of whether the content of the second snippet 308 factually confirms that of the first snippet 306.

Further, the server 202 can be configured to compare the second probability value to a predetermined probability threshold, which can be, for example, 0.85 or 0.95. In response to the second probability value being equal to or greater than the predetermined probability threshold, the server 202 can be configured to determine that the content of the second snippet 308 factually confirms that of the first snippet 306. Thus, in some non-limiting embodiments of the present technology, the server 202 can be configured to determine that the content of the first snippet 306 is factually accurate.

By contrast, if the second probability value is lower than the predetermined probability threshold, the server 202 can be configured to determine that the content of the second snippet 308 does not factually confirm the content of the first snippet 306. In this regard, in some non-limiting embodiments of the present technology, the server 202 can be configured to determine that the content of the first snippet 306 is factually inaccurate. Further, the server 202 can be configured to remove the first snippet 306 from the plurality of snippets 304, for example. In some non-limiting embodiments of the present technology, the server 202 can further be configured to remove digital document, from which the first snippet 306 has been extracted, from the respective set of reference digital documents used for generating the plurality of snippets 304.

However, in other non-limiting embodiments of the present technology, in response to determining that the second probability value is lower than the predetermined probability threshold, the server 202 can be configured to further determine the factual accuracy of the content of the first snippet 306 based on at least other ones of the plurality of snippets 304. Further, the server 202 can be configured to determine whether the content of the first snippet 306 is factually accurate or inaccurate based on a number of snippets whose contents have confirmed the factual accuracy of the content of first snippet 306 relative to a number of snippets whose contents have not.

For example, based on the second probability value provided by the NLP model 218, the server 202 can be configured to determine that the content of the second snippet 308 does not confirm the factual accuracy of the content of the first snippet 306. In other words, the server 202 can be configured to determine that the fact that Keanu Reeves was born in Beirut and raised in Canada contradicts the statement that he is an American actor. Further, the server 202 can be configured to determine that the content of the first snippet 306 is factually inaccurate and then remove the first snippet 306 from the plurality of snippets 304 output in the search summary 216.

By doing so, the present methods and systems allow factually validating contents of the search summaries generated based on search results provided to users, which may thus improve user satisfaction of the users from interacting with search engines.

Method

Figure 7:
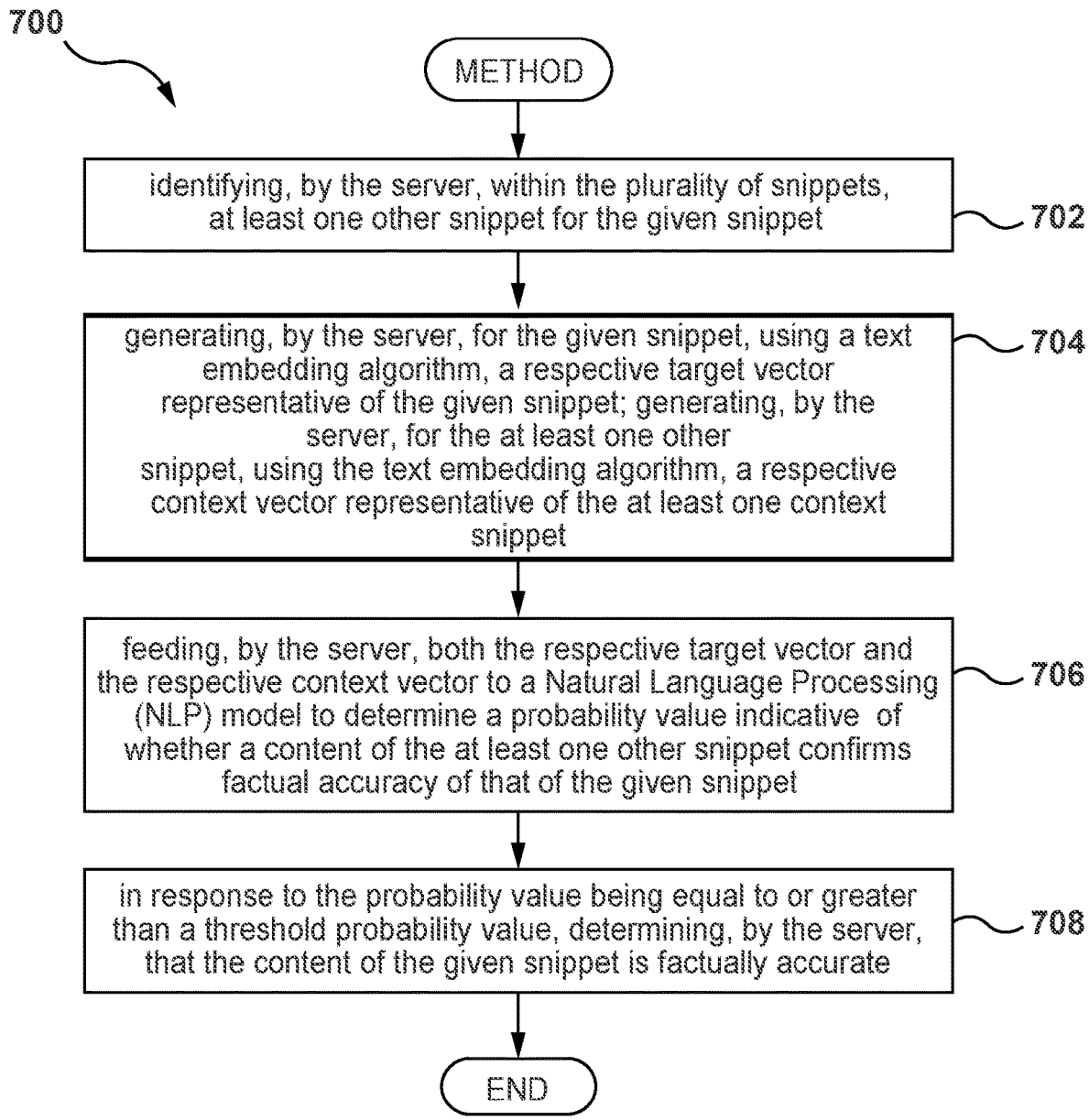
FIG. 7 depicts a flowchart diagram of a method of training the machine learning model implemented based on the machine-learning model architecture of either FIG. 4 or 5 to determine a probability value of whether a content of one snippet confirms factual accuracy of that of an other one, in accordance with certain non-limiting embodiments of the present technology.

Given the architecture and the examples provided hereinabove, it is possible to execute a method of factually validating a content of a given snippet, such as the first snippet 306, of the plurality of snippets 304. With reference now to FIG. 7, there is depicted a flowchart diagram of a method 700, according to certain non-limiting embodiments of the present technology. The method 700 may be executed by the server 202.

As mentioned hereinabove with reference to FIG. 2, in some non-limiting embodiments of the present technology, the plurality of snippets 304 can be generated by the server 202 running the generative machine-learning model that has been trained to extracts snippets of factual information from digital documents. Thus, for generating the plurality of snippets 304, the server 202 can be configured to identify, in the set of digital documents 214 responsive to the given search query 212, the respective set of reference digital documents. For example, the server 202 can be configured to identify the respective set of reference digital documents as a top N digital documents, such as 10, 20, and the like, in the set of digital documents 214 having been ranked in accordance with respective degrees of relevance of the digital documents to the given search query 212. Further, the server 202 can be configured to feed the respective set of reference digital documents to the generative machine-learning model to generate the plurality of snippets 304. As mentioned further above, the generative machine-learning model can be configured to generate the plurality of snippets 304 being a cohesive text.

Step 702: Identifying, by the Server, within the Plurality of Snippets, at Least One Other Snippet for the Given Snippet According to certain non-limiting embodiments of the present technology, at step 702, the server 202 can be configured to identify, in the plurality of snippets 304, at least one other snippet, such as the second snippet 308, providing the context to the first snippet 306. For example, in some non-limiting embodiments of the present technology, the server 202 can be configured to identify the second snippet 308 as being one of the neighboring snippets to the first snippet 306. However, in other non-limiting embodiments of the present technology, the server 202 can be configured to identify the second snippet 308 based on the linguistic analysis of the plurality of snippets 304. For example, the server 202 can be configured to identify the second snippet 308 as being a snippet semantically related to the first snippet 306, that is, a snippet including words semantically similar to those of the first snippet 306, as an example.

The method 700 thus proceeds to step 704.

Step 704: Generating, by the Server, for the Given Snippet, Using a Text Embedding Algorithm, a Respective Target Vector Representative of the Given Snippet; Generating, by the Server, for the at Least One Other Snippet, Using the Text Embedding Algorithm, a Respective Context Vector Representative of the at Least One Context Snippet At step 704, before applying the NLP model 218 to the first and second snippets 306, 308, the server 202 can be configured to apply thereto text embedding algorithms, such as the input embedding algorithm 410, mentioned above with reference to FIG. 4.

By doing so, the server 202 can be configured to generate, based on the first and second snippets 306, 308, the plurality of input vectors 414 for further input thereof to the NLP model 218.

The method 700 hence advances to step 706.

Step 706: Feeding, by the Server, Both the Respective Target Vector and the Respective Context Vector to a Natural Language Processing (NLP) Model to Determine a Probability Value Indicative of Whether a Content of the at Least One Other Snippet Confirms Factual Accuracy of that of the Given Snippet At step 706, the server 202 can be configured to feed the plurality of input vectors 414 to the NLP model 218 to determine the respective probability value of the content of the second snippet 308 factually confirms the content of the first snippet 306.

As mentioned hereinabove with reference to FIGS. 4 to 6, the server 202 can be configured to train the NLP model 218 to determine the respective probability values of whether a content of an other one of the plurality of snippets 304 factually confirms the content of the first snippet 306. In some non-limiting embodiments of the present technology, the NLP model 218 can be a Transformer-based machine-learning model, whose architecture described in detail above with reference to FIG. 4.

As mentioned further above, the server 202 can be configured to train the NLP model 218 in two stages: at the first training stage, or the pre-training stage, the server 202 can be configured to train, based on the first training set of data, the NLP model 218 to determine the first probability value of whether the contents of two in-use snippets, such as those of the first snippet 306 and the second snippet 308 of the plurality of snippets 304 are semantically coherent. In other words, at the first training stage, the server 202 is configured to train the NLP model 218 to determine whether the contents of each one of the first snippet 306 and the second snippet 308 relate to a same subject, such as to a nationality of the search object, as described above with reference to FIG. 3.

In some non-limiting embodiments of the present technology, the first training set of data comprises the first plurality of training digital objects, the given one of which comprises: (i) the first training snippet; (ii) the second training snippet; and (iii) the respective label indicative of whether the second training snippet is semantically coherent with the first training snippet. By feeding the first plurality of training digital objects to the NLP model 218, the server 202 can be configured to determine weights for the nodes of the NLP model 218, thereby training it to determine the first probability value of whether the second snippet 308 is semantically coherent with the first snippet 306.

Further, following the first training stage, at the second training stage, which is also referred to herein as the fine-tuning stage, the server 202 can be configured to train, based on the second training set of data, the NLP model 218 to determine the second probability value indicative of whether the second snippet 308 confirms factual accuracy of the first snippet 306.

According to certain non-limiting embodiments of the present technology, the second training set of data comprises the second plurality of training digital objects, the given one of which comprises: (i) the first training snippet; (ii) the second training snippet; (iii) at least one training prompt generated based on the first training snippet; and (iv) the respective label indicative of whether the content of the second training snippet confirms factual accuracy of the first training snippet. As mentioned further above, the at least one prompt generated based on the first training snippet can comprise either a rephrasing of the first training snippet or a questions to which the first training snippet answers. Thus, by feeding the second plurality of training digital objects to the NLP model 218, the server 202 can be configured to re-determine (or otherwise adjust) the weights of the nodes of the NLP model 218, thereby training it to determine the second probability value of whether the content of the second snippet 308 confirms the factual accuracy of the first snippet 306.

In some non-limiting embodiments of the present technology, the server 202 can be configured to execute the second training stage without re-determining the weights of the nodes of the NLP model 218, by applying the P-tuning approach. More specifically, in these embodiments, the server 202 can be configured to train another machine-learning model, such as the add-on model 502 described above with reference to FIGS. 5 and 6, to generate vectors to be input to the NLP model 218, based on which, the NLP model 218 can further be configured to determine the second probability value without re-adjusting the weights of its nodes.

As described in detail above with reference to FIG. 6, the add-on model 502 can be implemented based on an LSTM NN, such as the bidirectional LSTM 602.

In some non-limiting embodiments of the present technology, the server 202 can be configured to train the add-on model 502 based on the second training set of data. In other non-limiting embodiments of the present technology, the server 202 can be configured to train the add-on model 502 based on the third training set of data that can be generated in a similar fashion to the second training set of data; however, can be smaller in size than the second training set of data.

Thus, by feeding one of the second and third set of data to the add-on model 502, the server 202 can be configured to determine weights of the nodes of the add-on model 502, thereby training it to generate, based on the plurality of input vectors 414 and plurality of target vectors 419, the add-on input vectors 504 and the add-on target vectors 509. Further, the server 202 can be configured to input the add-on input vectors 504 and the add-on target vectors 509 to the encoder stack of layers 402 and the decoder stack of layers 403 of the NLP model 218, respectively. Accordingly, based on the add-on input vectors 504 and the add-on target vectors 509, the NLP model 218 can further be configured to determine the second probability value of whether the content of the second snippet 308 confirms factual accuracy of the content of the first snippet 306.

Thus, such an approach to fine-tuning the NLP model 218 to determine the second probability value allows avoiding re-adjusting, after the first training stage, the weights of the entirety of nodes of the NLP model 218, including, in some implementations, over a hundred billion nodes. Instead, this approach is directed to only training the add-on model 502, generally including substantially fewer nodes. By doing so, the present methods and systems allow saving computational resources of the server 202 on the training of the NLP model 218. Also, this approach to the fine-tuning of the NLP model 218 can be especially appreciated in unavailability of high-quality data for executing the second training stage.

The method 700 hence advances to step 708.

Step 708: In Response to the Probability Value being Equal to or Greater than a Threshold Probability Value, Determining, by the Server, that the Content of the Given Snippet is Factually Accurate At step 708, according to certain non-limiting embodiments of the present technology, the server 202 can be configured to compare the second probability value to the predetermined probability threshold, which can be, for example, 0.85 or 0.95. In response to the second probability value being equal to or greater than the predetermined probability threshold, the server 202 can be configured to determine that the content of the second snippet 308 factually confirms that of the first snippet 306. Thus, in some non-limiting embodiments of the present technology, the server 202 can be configured to determine that the content of the first snippet 306 is factually accurate.

By contrast, if the second probability value is lower than the predetermined probability threshold, the server 202 can be configured to determine that the content of the second snippet 308 does not factually confirm the content of the first snippet 306. In this regard, in some non-limiting embodiments of the present technology, the server 202 can be configured to determine that the content of the first snippet 306 is factually inaccurate. Further, the server 202 can be configured to remove the first snippet 306 from the plurality of snippets 304, for example. In some non-limiting embodiments of the present technology, the server 202 can further be configured to remove digital document, from which the first snippet 306 has been extracted, from the respective set of reference digital documents used for generating the plurality of snippets 304.

However, in other non-limiting embodiments of the present technology, in response to determining that the second probability value is lower than the predetermined probability threshold, the server 202 can be configured to further determine the factual accuracy of the content of the first snippet 306 based on at least other ones of the plurality of snippets 304. Further, the server 202 can be configured to determine whether the content of the first snippet 306 is factually accurate or inaccurate based on a number of snippets whose contents have confirmed the factual accuracy of the content of first snippet 306 relative to a number of snippets whose contents have not.

Thus, certain embodiments of the method 700 allow factually validate information before presentation thereof to the users of the online searching platforms, which may thus increase their user satisfaction from interaction therewith.

The method 700 hence terminates.

It will also be understood that, although the embodiments presented herein have been described with reference to specific features and structures, various modifications and combinations may be made without departing from such disclosures. For example, various optimizations that have been applied to neural networks, including transformers may be similarly applied with the disclosed technology. Additionally, optimizations that speed up in-use relevance determinations may also be used. For example, in some implementations, the transformer model may be split, so that some of the transformer blocks are split between handling a query and handling a document, so the document representations may be pre-computed offline and stored in a document retrieval index. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A computer-implemented method for factually validating a content of a given snippet of a plurality of snippets, the plurality of snippets generated for a search object by a generative machine-learning model, the search object having been identified based on a respective search query, the method being executable by a server, the method comprising:
   identifying, by the server, within the plurality of snippets, at least one other snippet for the given snippet,
      the at least one other snippet providing context to the given snippet;
   generating, by the server, for the given snippet, using a text embedding algorithm, a respective target vector representative of the given snippet;
   generating, by the server, for the at least one other snippet, using the text embedding algorithm, a respective context vector representative of the context provided by the at least one other snippet;
   feeding, by the server, both the respective target vector and the respective context vector to a Natural Language Processing (NLP) model to determine a probability value indicative of whether a content of the at least one other snippet confirms factual accuracy of a content of the given snippet,
   the NLP model having been trained to determine whether in-use snippets confirm factual accuracy of the given snippet; and
   in response to the probability value being equal to or greater than a threshold probability value, determining, by the server, that the content of the given snippet is factually accurate.

2. The method of claim 1, wherein the generative model is configured to generate the plurality of snippets based on reference digital documents of a plurality of digital documents responsive to the respective search query.

3. The method of claim 2, wherein:
   a given digital document of the plurality of digital documents has been pre-assigned with a relevance parameter indicative of how relevant the given digital document to the respective search query is; and
   the reference digital documents have been determined as being associated with top N highest respective relevance parameters.

4. The method of claim 1, wherein the identifying the at least one other snippet for the given snippet comprises identifying at least one other snippet, content of which is semantically related to at least one fact in the given snippet.

5. The method of claim 1, wherein the plurality of snippets generated by the generative machine-learning model form a cohesive text for the search object.

6. The method of claim 1, wherein the generative machine-learning model is a Transformer-based machine-learning model.

7. The method of claim 1, wherein the NLP model has been pre-trained to determine if two consecutive snippets of the plurality of snippets are semantically coherent therebetween.

8. The method of claim 7, wherein the NLP model has further been fine-tuned to determine the probability value of whether the content of the at least one other snippet confirms factual accuracy of the content of the given snippet by applying to the NLP model an add-on machine-learning model, the add-on machine-learning model having been trained to generate vector representations for the NLP model, training the add-on machine-learning model comprising:

obtaining, by the server, a plurality of training objects, a given training object of the plurality of training objects including (i) a respective first training snippet; (ii) at least one training prompt having been generated based on the respective first training snippet; (iii) a respective second training snippet having been identified as being contextually related to the respective first training snippet; and (iv) a respective label indicative of whether a content of the respective second training snippet factually confirms a content of the respective first training snippet; and feeding, by the server, the plurality of training objects to the add-on machine-learning model to train the add-on machine-learning model to generate (i) the respective target vector; and (ii) the respective context vector.

9. The method of claim 8, wherein the at least one training prompt comprises a question which the respective first training snippet answers.

10. The method of claim 8, wherein the at least one training prompt comprises a rephrasing of the respective first training snippet.

11. The method of claim 8, wherein the respective label has been assigned by a human assessor.

12. The method of claim 8, wherein the NLP model has been fine-tuned, by the server, with weights of nodes of the NLP model, determined after the NLP model was pre-trained, being frozen.

13. The method of claim 8, wherein the add-on machine-learning model comprises a Long Short-Term Memory (LSTM) neural network.

14. The method of claim 8, wherein fine-tuning of the NLP model comprises applying a P-tuning approach.

15. The method of claim 8, wherein the NLP model comprises a Transformer-based machine-learning model.

16. A server for factually validating a content of a given snippet of a plurality of snippets, the plurality of snippets generated for a search object by a generative machine-learning model, the search object having been identified based on a respective search query, the server comprising a processor and a non-transitory computer-readable memory storing instructions, and the processor, upon executing the instructions, being configured to:

identify within the plurality of snippets, at least one other snippet for the given snippet, the at least one other snippet providing context to the given snippet;

generate, for the given snippet, using a text embedding algorithm, a respective target vector representative of the given snippet;

generate, for the at least one other snippet, using the text embedding algorithm, a respective context vector representative of the context provided by the at least one other snippet;

feed both the respective target vector and the respective context vector to a Natural Language Processing (NLP) model to determine a probability value indicative of whether a content of the at least one other snippet confirms factual accuracy of a content of the given snippet, the NLP model having been trained to determine whether in-use snippets confirm factual accuracy of the given snippet; and in response to the probability value being equal to or greater than a threshold probability value, determine that the content of the given snippet is factually accurate.

17. The server of claim 16, wherein to identify the at least one other snippet for the given snippet, the processor is configured to identify at least one other snippet, content of which is semantically related to at least one fact in the given snippet.

18. The server of claim 16, wherein the NLP model has been pre-trained to determine if two consecutive snippets of the plurality of snippets are semantically coherent therebetween.

19. The server of claim 18, wherein the NLP model has further been fine-tuned to determine the probability value of whether the content of the at least one other snippet confirms factual accuracy of the content of the given snippet by applying to the NLP model an add-on machine-learning model, and the processor is further configured to train the add-on machine-learning model to generate vector representations for the NLP model, by:

obtaining a plurality of training objects, a given training object of the plurality of training objects including (i) a respective first training snippet; (ii) at least one training prompt having been generated based on the respective first training snippet; (iii) a respective second training snippet having been identified as being contextually related to the respective first training snippet; and (iv) a respective label indicative of whether a content of the respective second training snippet factually confirms a content of the respective first training snippet; and feeding the plurality of training objects to the add-on machine-learning model to train the add-on machine-learning model to generate (i) the respective target vector; and (ii) the respective context vector.

20. The server of claim 19, wherein the at least one training prompt comprises a question which the respective first training snippet answers.

* * * * *